(12) United States Patent
Vertes

(10) Patent No.: US 7,774,647 B2
(45) Date of Patent: *Aug. 10, 2010

(54) METHOD FOR COUNTING INSTRUCTIONS FOR LOGGING AND REPLAY OF A DETERMINISTIC SEQUENCE OF EVENTS

(75) Inventor: Marc P. Vertes, Saint-Lys (FR)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/814,302

(22) PCT Filed: Jan. 24, 2006

(86) PCT No.: PCT/EP2006/050406

§ 371 (c)(1),
(2), (4) Date: Jul. 19, 2007

(87) PCT Pub. No.: WO2006/079623

PCT Pub. Date: Aug. 3, 2006

(65) Prior Publication Data

US 2009/0119549 A1    May 7, 2009

Related U.S. Application Data

(63) Continuation of application No. 11/814,465, filed on Jul. 20, 2007.

(30) Foreign Application Priority Data

Jan. 28, 2005    (FR) .................................. 05 00905

(51) Int. Cl.
*G06F 11/00* (2006.01)
(52) U.S. Cl. ........................................ 714/15; 714/20
(58) Field of Classification Search ....................... None
See application file for complete search history.

(56) References Cited

U.S. PATENT DOCUMENTS

| 5,774,660 | A | 6/1998 | Brendel |
| 5,961,654 | A | 10/1999 | Levine |
| 6,023,772 | A * | 2/2000 | Fleming ........................ 714/13 |
| 6,574,750 | B1 * | 6/2003 | Felber et al. ................... 714/20 |
| 6,708,296 | B1 | 3/2004 | Gover |
| 7,373,548 | B2 * | 5/2008 | Reinhardt et al. .............. 714/13 |
| 2005/0251785 | A1 | 11/2005 | Vertes et al. |
| 2007/0214342 | A1 * | 9/2007 | Newburn et al. ............. 712/216 |

FOREIGN PATENT DOCUMENTS

EP            0864979 A2      9/1998

OTHER PUBLICATIONS

M Russinovich et al, "Replay for Concurrent Non-Deterministic Shared-Memory Applications", ACM Sigplan Notices, Association for Computing Machinery, New York, vol. 31, No. 5, May 1, 1966, pp. 258-266, XP000593204, ISSN: 0362-1340.

* cited by examiner

*Primary Examiner*—Michael C Maskulinski
(74) *Attorney, Agent, or Firm*—Libby Z. Toub

(57) ABSTRACT

This invention relates to a transparent and non-intrusive method for monitoring and managing the running of tasks executed in one or more computer processors, in particular in multi-processor systems with a parallel architecture. It proposes a system and method for managing a computer task, termed target, during a given execution period, termed activity period (SchJ, SchR), within a computer system, in a computer processor provided with means of monitoring or estimating performance and including a counter (PMC) with a given possible error in plus or minus, termed relative error, this process comprising on the one hand, an evaluation of a number of executed instructions (NR, NJ) up to at least one given point of said activity period, using said counter; and on the other hand, a generation of data, termed signature (SGJ, SGR), read or calculated from the state of the processor or computer system and corresponding to at least one given point of said activity period.

13 Claims, 6 Drawing Sheets

METHOD FOR COUNTING INSTRUCTIONS FOR LOGGING AND REPLAY OF A DETERMINISTIC SEQUENCE OF EVENTS

Pursuant to 35 U.S.C. §120, this continuation application claims priority to and benefit of U.S. patent application Ser. No. 11/814,465, entitled "Method for Optimising the Logging and Replay of Multi-Task Applications in a Mono-Processor or Multi-Processor Computer System", filed on Jul. 20, 2007, with a Priority Date of Jan. 24, 2005, the disclosure of which is incorporated herein in its entirety for all purposes.

FIELD OF THE INVENTION

This invention relates to a transparent and non-intrusive method for monitoring and managing the running of tasks executed in one or more computer processors, in particular in multi-processor systems with a parallel architecture. It applies in particular to the various tasks of a multi-task transactional application executed in a network. This management in particular enables a recording of the running of these tasks in the form of logging data, as well as a replay of this running from such logging data in order to present a behaviour and a result corresponding to those obtained while logging.

The invention also relates to a system implementing such a method in the functioning management of the software applications that it executes.

BACKGROUND OF THE INVENTION

Implementing a functioning management which is non-intrusive and transparent regarding the managed application is very useful, in particular for enabling the use the numerous existing applications with more flexibility, or reliability, or performance, in their original state ("legacy applications").

Non-intrusive functioning management techniques by intermediate capture and by restoration of the state of an application on a synchronisation point or restart point ("checkpoint") have already been proposed by the same applicants in patent application FR 04 07180. In a complementary manner, non-intrusive logging and replay techniques have already been proposed by the same applicants, in particular in patent applications FR 05 00605 to FR 05 00613.

However, the logging of one or more events still represents a work overhead for the logged application or the system which executes it, and minimising it as far as possible is very interesting.

Among the events constituting the execution of an application, those which have a non-deterministic behaviour vis-à-vis the state of the application must be logged and replayed by storing their result in the logging data, for enabling a forcing or reinjecting of this result during a later replay. It is therefore of interest to reduce as far as possible the number of events which must be treated as non-deterministic.

Events external to the application, or to the system which is executing it, often have a behaviour which is intrinsically non-deterministic, and must in general be stored, for example as described in the applications cited earlier.

Internal events, by comparison, most frequently have a deterministic behaviour and also constitute the majority of operations executed in the running of an application. It is therefore of interest to aggregate and optimise the logging of non-deterministic events, in particular internal.

If all the events from a portion of the running are deterministic, all this portion can be logged in an economic manner simply by storing the start state of the application, for example in the form of a restart point. The replay is then obtained, for example, by restoring the application into the restart point state as stored, and by launching the execution of these deterministic events. The term "piecewise deterministic execution model", comprising a grouping of deterministic portions composed only of deterministic events can then be used. The boundaries of deterministic portions are thus in general constituted by non-deterministic events, for example an arrival of an external message at the beginning and another non-deterministic event for the end.

SUMMARY OF THE INVENTION

One aim of the invention is to simplify or optimise the logging and the replay of such a deterministic portion.

Moreover, certain types of computer architecture may include non-determinism causes sometimes inherent to their own nature, in particular the parallel architecture system, sometimes qualified as physical or actual parallelism.

Another aim of the invention is therefore to facilitate or optimise the implementation of logging and replay functions, and to reduce the causes of non-determinism within a parallel environment, in particular for multi-task applications.

In the context of an functioning management in a redundant architecture, another aim of the invention is then to reliabilize the functioning of a multi-task application executed in a parallel environment.

A deterministic portion, by its nature, will always give the same result when it starts from a same situation and executes the same instructions. In order to log and replay such a deterministic portion, it is therefore possible to store and restore only the start situation, and to let the execution happen out of the same executable file, during the number of instructions corresponding to the length of this portion.

However, if this is not envisaged in the original application, the implementation of a counting of the executed instructions represents a significant work load for the machine(s) executing these instructions. With known techniques, such an overload is often unacceptable or limits such an implementation to experimental situations, and is hardly usable in an exploitation situation.

One aim of the invention is to overcome all or some of these drawbacks.

For this, the invention proposes a method for managing a computer task, termed target, during a given execution period, termed activity period, within a computer system, in a computer processor provided with means of monitoring or of estimating performance, these means including a counter with a given possible error in plus or minus, termed relative error.

This method comprises on the one hand an evaluation of a number of instructions executed up to at least one given point of said activity period, using said counter; and on the other hand a generation of data, termed signature, read or calculated from the state of the processor or of the computer system and corresponding to at least one given point of said activity period.

Advantageously, the evaluation of the number of instructions executed since the start of the managed period uses at least one system call instruction as a synchronisation barrier jointly with the computer.

This method is particularly useful for managing a task during an activity period composed of a succession of deterministic operations between two non-deterministic operations.

The invention thus proposes to manage a task being logged in a processor, termed logged processor, and comprises a storing of logging data corresponding to this activity period of said task, termed logged period. Such logging data then comprises at least one supposed value of the number of instructions executed, as well as the signature, termed logged signature, corresponding to the end of said logged period.

It is thus possible to log the use of a processor by storing in an ordered fashion, in at least one file termed processor log, logging data representing the logging of a succession of activity periods from a plurality of tasks executed in said processor, and comprising for each of these periods an item of data identifying the executed task.

From such logging data, the invention also proposes a replay of the logged period by managing a task termed replayed, executed by a processor termed replay processor, within a replay computer system, starting from a state corresponding to the state of the logged processor or to the logged system at the start of the logged period. The method then also comprises:

from the start of the replay period, a monitored execution phase executing a number of instructions, evaluated by the counter, less than or equal to the supposed value of the number of instructions of the logged period, reduced by the relative error of said counter;

a confirmation phase comprising an iteration of the following steps:

interruption of the execution of the replay task at a given point in the replay;

comparative test between the logged signature and the signature corresponding to the replay interruption point.

In particular, the logged signature includes a datum termed logged pointer, representing the value of the instruction pointer of the logged task at the end of the logged period. The method then also comprises a setting up of a break point on the replay instruction corresponding to the logged pointer datum.

According to the invention, monitoring of the execution of the replay task comprises in particular an overflow of the counter, initialised beforehand in order to determine a number of instructions having to be executed from the start of the replay period and the overflow of which causes an interruption of the replay task.

However, because this type of counter is not envisaged for such an exact usage, such an interruption can occur with a certain delay after the counter overflow.

The invention therefore proposes to initialise the counter at the start of the replay period with a certain margin, in order to overflow sufficiently early in order that, in case of a latency period existing between the overflow of the counter and the interruption of the task which has caused it, the number of instructions executed by the replay task is less than or equal to the supposed value of the number of instructions of the logged period, reduced by the relative error of said counter.

Moreover, as a security, the confirmation phase may comprise a security step signalling an error if the number of replayed instructions exceeds the supposed value of the number of logged instructions increased by a given number of instructions.

From a log representing several periods logged in this manner, the invention may thus carry out, in a processor termed replay, a replay of the use of a logged processor, by using an ordered set of logging data from a succession of activity periods logged in said logged processor.

The invention also provides for a logging of a succession of attributed exclusive accesses pertaining to a shared resource, termed target resource, accessed by a plurality of logged tasks, this method also transmitting or storing at least one file termed resource log. This resource log thus comprises logging data representing an identification of each of the different successive tasks having obtained these exclusive accesses.

Starting from these techniques, the invention proposes to manage the functioning of at least two application tasks, within a system software managing by sequential activation the execution of said tasks in a computer system, endowed with a parallel structure comprising means of calculation capable of executing several application tasks simultaneously in at least two arithmetic units. For such application tasks accessing at least one shared resource, the method comprises on the one hand the following steps:

a logging of a first succession of activation periods of one or other of these tasks in a first arithmetic unit; and a logging of a second succession of activation periods of one or other of these tasks in a second arithmetic unit;

and a logging of a succession of attributions, to a so-called accessing task among said tasks in response to a request for access to said target resource, of an access termed exclusive to said target resource, i.e. such an attribution excluding any access to said target resource by another of these tasks during the entire rest of the activation period of the accessing task immediately after said request for access.

On the other hand, the method also comprises a combination, in an ordered structure termed replay serialisation, of logging data representing the successions of activation periods in each of the arithmetic units, combined with logging data representing the succession of attributed exclusive accesses. This combination is arranged so as to maintain the order of succession of the activation period within each task and vis-à-vis said shared resource.

According to the invention, the replay serialisation data may be used in a replay computer system for replaying the logged running of the logged tasks.

Moreover, the method may comprise a virtualisation, within the replay computer system, of all or part of the software resources accessible, during the logging, to the tasks logged.

The method according to the invention enables in particular carrying out a replication, termed active, of the functioning of a logged application comprising at least two tasks, executed on at least one node with a parallel structure, termed primary node, of a computer network and accessing at least one shared resource. This replication therefore comprises a replay, in at least one replay application on a replay system, of a replay serialisation originating from logging data transmitted on-the-flow from the primary node to the second node when generated.

In one embodiment, the invention may then carry out reliabilization of an application comprising at least two tasks, executed on at least one node with a parallel structure, termed primary node, of a computer network and accessing at least one shared resource. This reliabilization thus comprises also a switching of service, from the primary node to at least one secondary node instead of the primary node, initiated on detection of a failure or of a given event within the primary node.

In another embodiment, the invention may also carry out a balancing or an adjustment of the workload within a computer network executing on at least one secondary node an active replica of a target application executed on a primary node. This load balancing thus comprises a switching to the active replica of all or part of the service provided by the managed target application.

Therefore, the method according to the invention may be implemented within at least one node of a computer network, for example a network constituting a cluster managed by one or more functioning management applications of the middleware type. The method thus enables extending or optimising the performances and functionalities of this functioning management, in particular by logging and replaying of instructions sequences.

In the same context, the invention also proposes a system implementing the method, applied to one or more computer systems of the parallel type or constituting a parallel system, and possibly used in a network.

BRIEF DESCRIPTION OF THE DRAWINGS

Other features and advantages of the invention will become apparent from the detailed description of an embodiment, which is in no way limitative, and the appended drawings in which.

DETAILED DESCRIPTION OF THE PREFERRED EMBODIMENT

The techniques described here correspond to embodiments of the invention using certain characteristics of processors of the types employed in computers of the PC type, for example processors of the Athlon type from the AMD company or Pentium processors from the Intel company. Other current processors, for example used in workstations, or future processors, can of course present all or some of these characteristics or similar characteristics, and be employed to carry out the invention.

Figure 1:
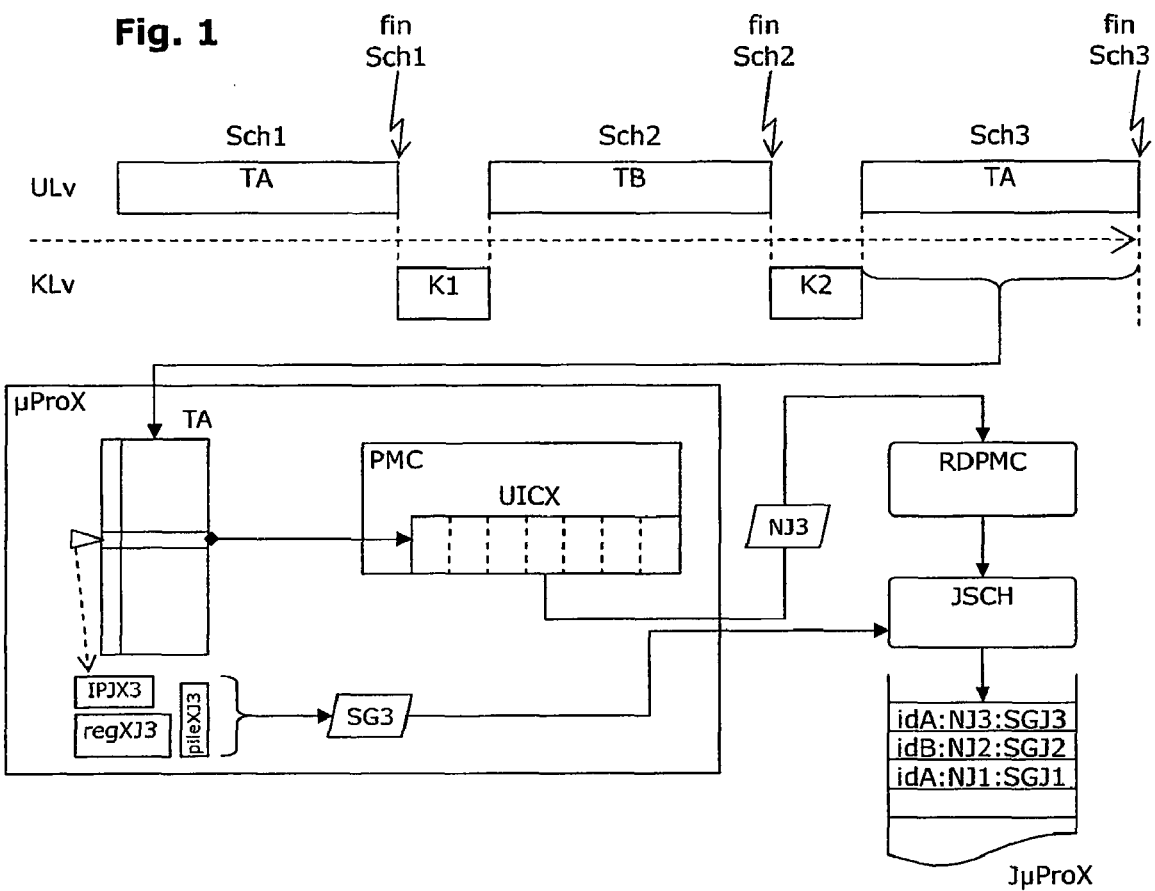
FIGS. 1 and 2 illustrate a logging of the scheduling of the execution of the tasks within a processor, by counting the tasks according to the invention.
Figure 2:
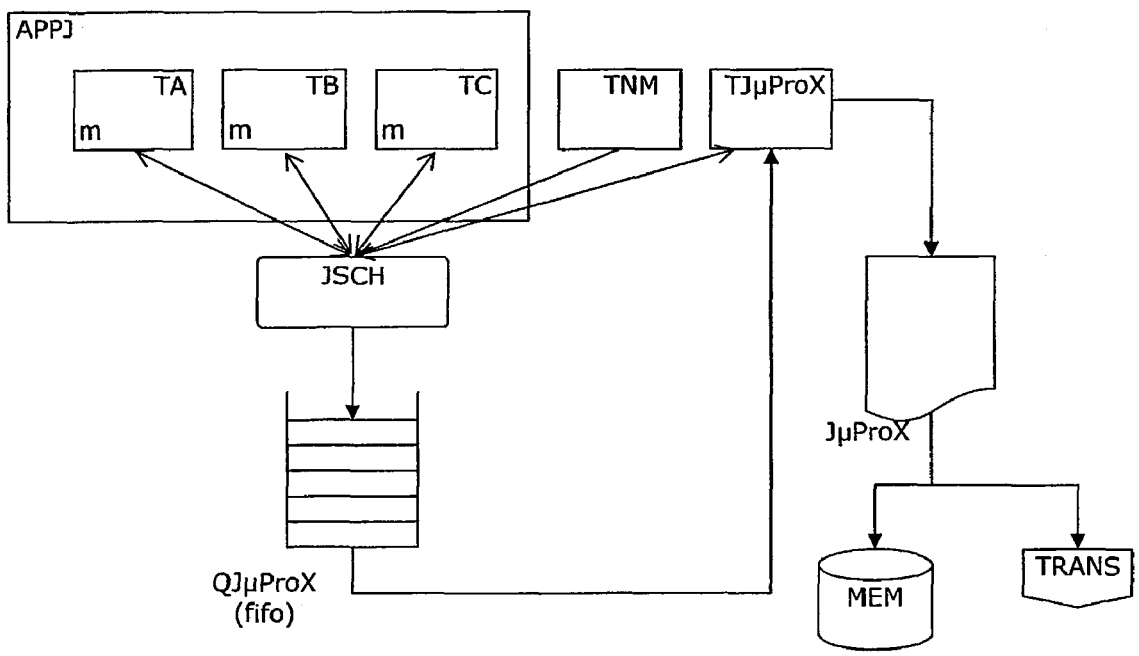

FIGS. 1 to 2 present a technique for the logging of different portions of deterministic internal events executed successively by a single µProX processor or arithmetic unit.

As illustrated in FIG. 1, different tasks TA and TB may be executed by portions, termed activation periods Sch1 to Sch3, launched successively by the scheduler SCH, forming part of a system agent termed context manager and which manages these alternations or interlacings.

Among the different tasks executed within a computer system or a processor, some may be part of an application which one seeks to manage, and will be qualified as "monitored" tasks. These tasks are identified by the state (set to 1) of a normally unused data bit within the task descriptor, here termed management bit MmA or MmB (see FIG. 7). Monitored tasks and others which are not monitored may alternate within the succession of activation periods executed in a processor.

For the monitored tasks TA and TB, marked in FIG. 2 by a letter "m", the activation periods are chosen such that they are composed of deterministic events only. These deterministic periods are defined by one or more logging software agents. This logging agent may comprise elements executed in the user memory space of the computer system, as a task of an functioning management application. This logging agent may also comprise or use elements modified or added within the system software, for example within the scheduler.

Because the majority of events of an application are internal events, and that lots of them are deterministic, a large part of each managed task is made up of deterministic events. Each time a non-deterministic event occurs, the logging agent closes a deterministic period. The non-deterministic event detected is then executed, possibly in the form of an unmonitored task, and is logged with its result according to a known method. On completion of this non-deterministic event, the logging agent defines the start of a new deterministic portion and launches again the counting of the instructions.

The logging, and possibly the processing, of the non-deterministic events is carried out outside of deterministic activation periods, or example in an execution period K1 or K2 in kernel mode KLv, i.e. while the processor privilege mode is at the value 0, as opposed to the value 3 for the user mode Ulv.

In order to be capable of replaying each activation period in an identical manner as that on logging, the invention performs a counting of the instructions executed during this deterministic portion when logging. During a later replay RSCH (see FIGS. 3 and 4) of these tasks, this logged portion thus only needs to be launched from a same state as that on logging, for it to execute on its own up to a number of replay instructions corresponding exactly to the number of instructions executed by this same portion on logging and for this same task. This replay is therefore carried out without any intervention forcing the results within a deterministic portion, as the latter contains only deterministic events.

When a deterministic portion extends over a plurality of activation periods established by the scheduler, each of these activation periods comprises a part of this deterministic portion, which can be itself processed as a complete deterministic portion. In the remainder of the description, only the logging of deterministic activation periods will be described, but it is clear that a number of deterministic activation periods may follow one another within a single deterministic portion.

According to the invention, this counting of instructions of a deterministic activation period uses a performance and monitoring counter, which is currently an existing hardware feature in a large number of processors, for example since Pentium 2 for the Pentium family from the Intel company. This performance and monitoring counter is provided in order to measure the functioning of the processor, in duration or in a number of events, and is used principally to measure performances, for example in order to carry out statistical analyses of application profiles, by periodic sampling of its values. Processor manufacturers also specify that these performance counters do not have a guaranteed accuracy and must be used for relative or differential measurements for optimisation of an application.

The invention proposes to use one of the characteristics of this performance counter PMC, namely the counting of instructions termed retired, i.e. which are resolved or have left the list of instructions to be executed, independently of the various speculative or cache techniques capable of having certain instructions executed in advance for performance reasons.

However, this counting of retired instructions presents certain limiting characteristics which are described in the documentation from the Intel and AMD companies. One of these characteristics is that the reading instructions ("RDPMC") for this counter are not integrated directly into the instructions to be resolved, which has no direct consequence on the use of this counter in connection with the invention.

On the other hand, two other limiting characteristics may originate inaccuracies in the counting of instructions for logging and replay and should be taken into account.

A fourth characteristic capable of constituting a handicap is the fact that the interruption of the execution by counter overflow may occur with a certain delay after the instruction having caused this overflow.

These inaccuracy limits relate, on the one hand, to cases of certain complex instructions which can be counted twice if interrupted before resolution, and, on the other hand, instructions with hardware interruption which can cause a non-counting of an instruction. To overcome this inaccuracy, the invention uses a complementary confirmation technique which enables removing doubts concerning the exact determination of the end of an activation period.

As illustrated in FIG. 1, a succession of deterministic activation periods Sch1, Sch2 and Sch3, executed in a µProX processor are logged and recorded in a log file JµProX.

During a logged activation period Sch3 where the processor is executing a monitored task TA, one or more readings RDPMC of the value UICX of the counter PMC supplies a number NJ3 of retired instructions. At the suspension (end Sch3) of this period Sch3, the logging agent JSCH uses one or more items of state data output by the state of the task TA and of its context in order to calculate one or more items of data representing this state in a sufficiently univocal manner for removing the doubts which may exist concerning the exact number of instructions executed during this activation period Sch3. This state data constitutes a signature SG3 corresponding to this end of period (end Sch3). This signature comprises in particular the exact value IPJX3 of the instruction pointer immediately after the last instruction of this period, i.e. an exact identification of the position, within the executable of the task TA, of the program instruction executed last. This signature also comprises a control datum ("checksum") calculated from the values read in the register RegJX3 and the call stack PileJX3 from the context of the task TA on this suspension (end Sch3).

For each of the logged periods SchJ (FIG. 3), the log JµProX of this processor thus comprises a line associating in particular:
  an identification idJ of the task TJ executed in this period, for example the "PID" of this task;
  the value of the number of withdrawn instructions NJ sent by the counter PMC;
  the signature SGJ calculated for the end of this period.

Thus, for the succession of tasks TA then TB then TA illustrated in FIG. 1, the log JµProX of the processor µProX comprises the following successive lines:
  "idA: NJ3: SG3
  idB: NJ2: SG2
  idA: NJ1: SG1"

As illustrated in FIG. 2, the succession of the different tasks logged of a logged application APPJ, within a given µProX processor, may also be transmitted initially by the logging agent JSCH to a logging queue QJµProX of the FIFO ("First In First Out") type. The logging lines at the output of this queue are read by a log storing task TJµProX, which initiates the storing of these lines in an ordered manner in the log JµProX of this processor, either locally MEM or by a transmission TRANS to another node or a backup station or peripheral. The use of such a logging queue serves in particular as a buffer zone in order to regulate the flow of logging data and to avoid disturbing the logged application or the application carrying out this logging.

This benefit is particularly appreciable in the case of a global architecture where the logging data is transmitted as it occurs, on-the-flow, to another application replaying the same running, for example on a standby machine in order to carry out a functioning with fault tolerance and continuity of service.

In this counting technique it may be advantageous to use system call instructions as synchronisation points for the counting of instructions. This therefore involves instrumenting the system call routines such that they increment a system calls counter. The counting of the instructions by the hardware counter PMC can therefore work on the values which remain lower, which improves its performances.

Figure 3:
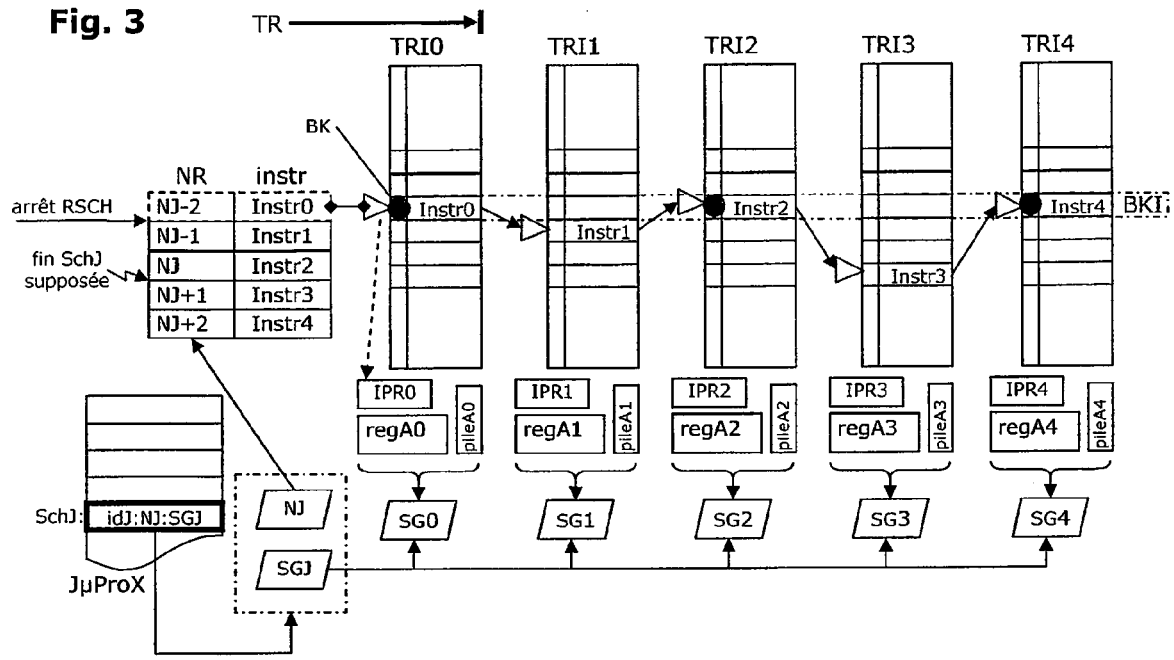
FIGS. 3 and 4 illustrate, according to the invention, a replay of an activity period of a task by counting instructions in a processor.
Figure 4:
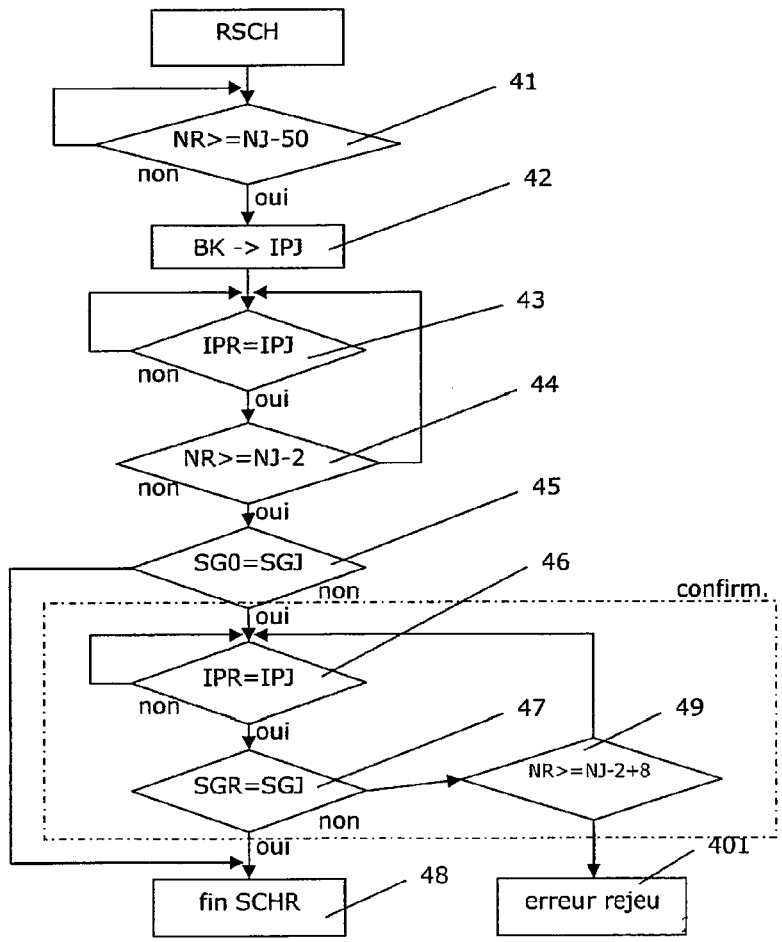

FIGS. 3 and 4 present a replay technique in a replay processor µProZ, of a logged period SchJ. FIG. 3 represents the latest states TR1 to TR4 of a replayed task TR, within the processor. FIG. 4 represents a flow diagram of the method used to implement such a replay. Depending on the embodiments or usage parameters, the replay may also be done in the same processor as the logging, for example for an functioning management of the application tracing type, according to the same principle as that for a different replay processor.

During such a replay, for example, as an activation period scheduled by the scheduler SCH, possibly modified in order to include a replay agent RSCH, the task in question TJ is restored with its context in the processor mentioned, then this task is released 41 and its execution is launched.

In order to be capable of being restored and executed in a replay computer system different to that where the logging was done, all or part of the resources accessible to a task or an application must be virtualised, i.e. instantiated or recreated, for example in a virtual manner, in order to appear to the replayed application in the same way as while logging. The items generally involved are the task identifiers, for threads TIP or processes PID, together with most of the resources accessed by the application and which depend on the host system. This virtualisation is performed at the start of the replayed task or application, and is modified during the replay so as to change in the same way as during the logging, according to the data stored during this logging.

Advantageously, this virtualisation is done in kernel mode, which enables in particular avoiding its operations being taken into account in the counting of the instructions by the performance counter PMC.

The documentation from the Intel company specifies that the error due to a hardware interruption is limited to a relative error of plus or minus one instruction. For a logged deterministic period including at most one single hardware interruption, i.e. that which caused its closure, monitoring requires taking into account two values of the counter PMC: the value at the start of the replay period and the value at the monitoring point. The maximum relative error is therefore plus or minus two instructions.

Throughout the execution of the replay task TR for the replay of the logged task TJ, the replay agent RSCH monitors the number of instructions retired by reading RDPMC the counter PMC of the processor µProZ carrying out the replay and by comparing this reading with the logging data IdJ, NJ, SGJ corresponding to this logged task TJ. This monitoring is arranged in order to interrupt the execution of the replay task TR once the instruction is reached whose ordinal value in this replay execution equals NJ−2. This interruption is done for example by programming an overflow of the counter PMC at the desired value.

Because of the fourth limiting characteristic cited above, the existence of a latency time between the overflow and the interruption may be compensated by programming the overflow 41 (FIG. 4) with a certain margin, so as to be certain that the interruption is produced before the desired value of NJ−2. This margin may be determined by experiment and may be, for example, of the order of 50 instructions.

The initial execution of the replayed period SchR is therefore interrupted at a number of instructions between NJ−50 and NJ−2. The replay agent RSCH then sets 42 an execution breakpoint BK within the executable of the replay task TR, on program instruction BKI corresponding to the value IPJ of the instruction pointer stored in the signature SGJ. The execution is then re-launched until interruption 43 by this breakpoint BK, on and on with testing 44 the number of instructions from the counter PMC until the number of replayed instructions is greater than or equal to the number of logged instructions minus two instructions, i.e. NR=NJ−2.

The exact position of the actual end of the logged period SchJ is thus situated in the four following unitary instruction executions Instr0 to Instr3, with the respective ordinal values NJ−1 to NJ+2, i.e. at a relative position included between minus two and plus two compared with the position NJ of the supposed end of this same period SchJ.

A confirmation phase 40 (FIG. 4) then enables to determine this actual position, by comparison between the signature SGJ and a value SG1 to SG4 (FIG. 3) calculated in the same way from the state TR1 to TR4 of the replay task TR, after the following unitary instruction executions Instr1 to Instr4.

At the start of this confirmation phase, the replay agent checks 45 the value SG0 of a replay signature SGR calculated according to the state of the replay task TR immediately after the interruption caused by the preceding monitoring.

According to the invention, if the signatures SGJ and SG0 do not correspond, the execution of the task TR is then relaunched, and stops 46 on the first new execution TR2 of this breakpoint instruction BKI.

There may, however, be a doubt as to this new stopping position TR2, for example if the logged task TJ has carried out a very short loop by executing several times this breakpoint instruction BKI before being suspended. At each break TR2, TR4 of the execution on this breakpoint instruction BKI, the replay agent verifies 47 again the matching of the signatures SGJ and SGR and relaunches the execution until this matching is obtained. When the signatures correspond (SGJ=SG4 in this example), it means the last execution Instr4 of the breakpoint instruction BKI corresponds to the last operation logged in the logged period SchJ. The replay agent then closes 48 the replay period SchR.

The invention also envisages a security mechanism, for example a test 49 interrupting the replay TR and returning 401 a replay error after a certain number of specific executions of instructions in order to avoid an infinite loop in case of error, for example at the end of eight unitary instruction executions.

In order to replay a plurality of logged periods, for example on a replay of a replay application APPR (FIG. 5) corresponding to the logged application APPJ, the replay agent RSCH successively reads the different lines of the log JμProX and uses each of these in order to replay an activation period corresponding to the line in question.

Figure 5:
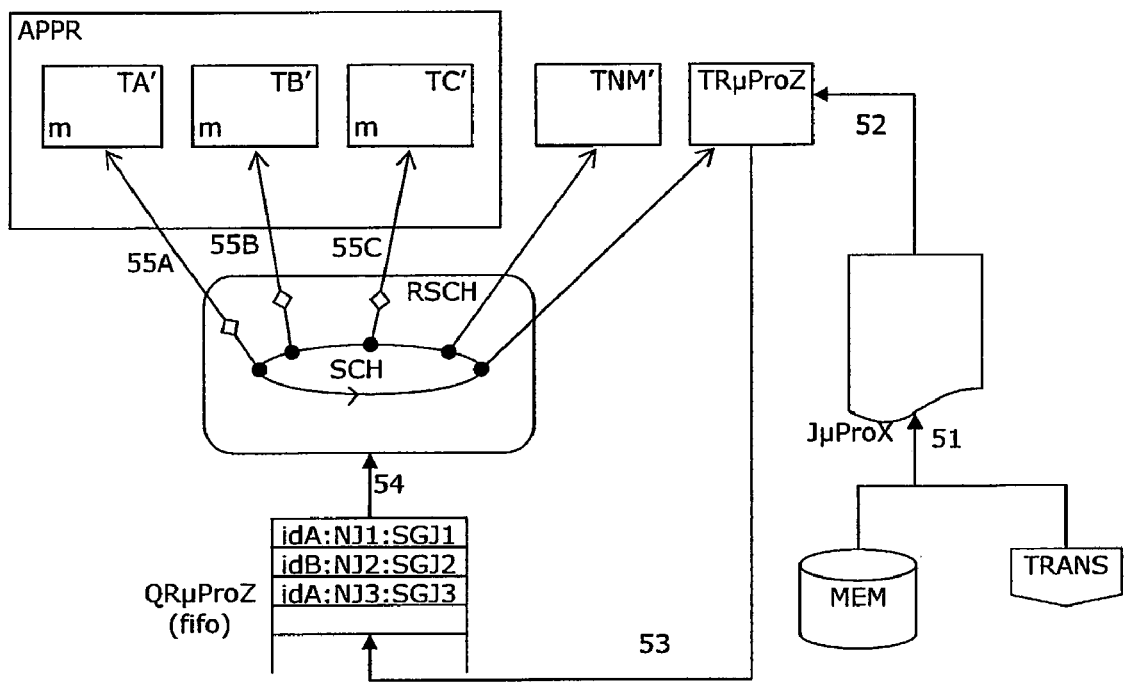
FIG. 5 illustrates, according to the invention, a deterministic replay of a multi-task application in a monoprocessor system, obtained from a logging, by counting instructions, of the task scheduling in a processor.

As illustrated in FIG. 5, the different lines of this log JμProX are received TRANS directly or read MEM locally, by a log reading task TμProZ executed in the replay processor μProZ.

All the lines of this log JμProX, each corresponding to a logged period, are then transmitted to a replay queue QJμProZ of the FIFO type, in the order in which they were logged. At the output of this queue, the replay agent RSCH uses each of these log lines to have the period which it represents replayed by the replayed tasks TA', TB' and TC', corresponding to the logged tasks TA, TB and TC.

In order to carry out the scheduling of these periods within the replay processor μProZ, the replay agent RSCH uses the functioning of the scheduler SCH as it exists in the standard system software without semantic change. This aspect enables in particular maintaining compatibility with the other TNM' tasks executed in the same processor. In order to obtain the same scheduling as while logging, without disturbing the normal functioning of the scheduler SCH, the replay agent RSCH contents itself with blocking 55b, 55c the release of each replay task TB', TC' as long as their identifiers, TID or PID, do not correspond to the identifier idA stored in the line the replay of which it must procure.

These techniques for logging and replay of deterministic periods enable to optimise the performances and the functionalities of an functioning management application within one or more mono-processor computers, as described in the applications cited above.

In the case of a parallel architecture, such as a multi-processor computer or a network comprising a number of computers working in parallel, the use of shared resources accessible by a plurality of tasks adds a non-determinism cause which can be at the origin of significant performance losses in the context of this functioning management, or even of the impossibility of implementing certain important and useful functions.

In order to remove all or some of these causes of non-determinism, the invention proposes a method enabling managing or controlling access to shared resources, in particular direct access resources, such that each task could obtain an exclusive access to the shared resources for the whole of a period where it is activated by the system.

Figure 6:
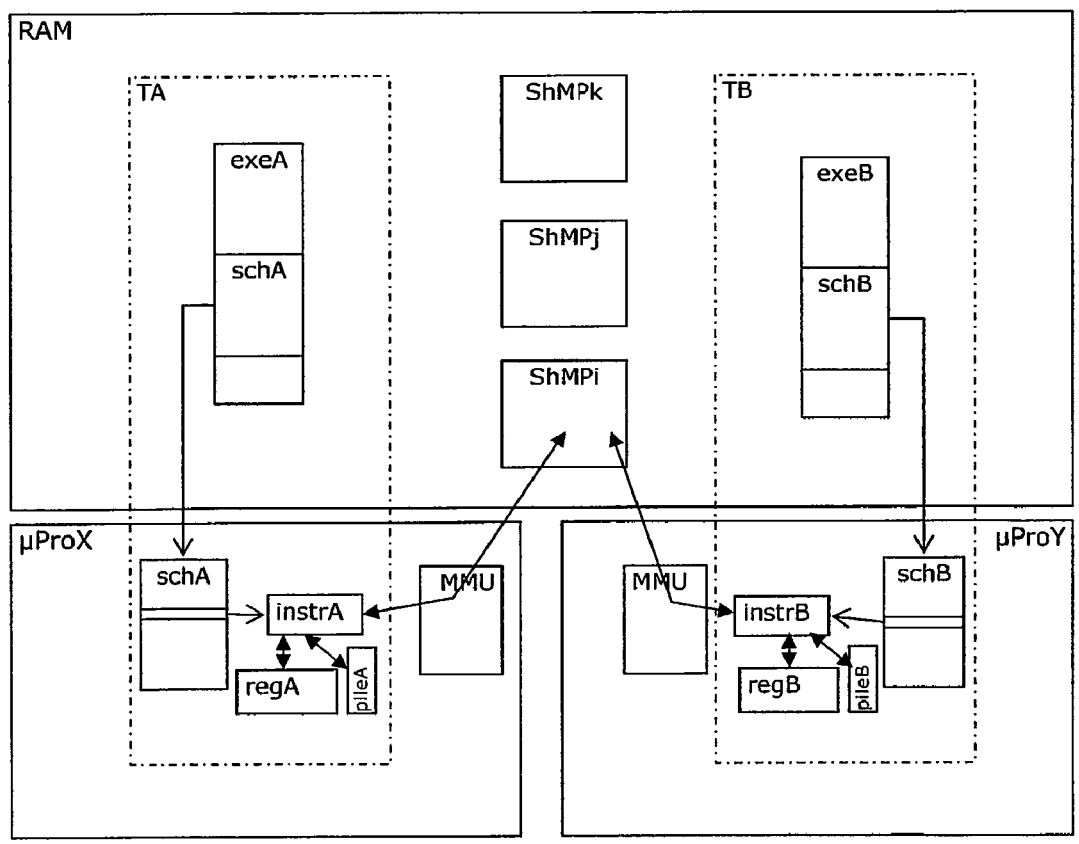
FIG. 6 is an illustration of the functioning, according to the prior art, of the access to a memory shared between two tasks executed in parallel by two different processors from a single environment.

In FIG. 6 an example of the functioning of a parallel multi-processor environment is illustrated, comprising a first processor μProX and second processor μProY in a multi-processor environment, for example, a system of the Linux type. These two processors each execute a task in parallel, TA and TB respectively, within a single working memory space RAM, and are coordinated by a scheduler. During an activation period of each task TA and TB, a sequence SchA, SchB of the instructions from its program EXEA, EXEB will be executed in a processor μProX, μProY. During the execution of an instruction InstrA, InstrB from this sequence, the processor will be able to use resources which are internal to it, such as the registers RegA, RegB a stack PilA, PilB.

Within the working memory RAM, several shared memory zones ShMPi to ShMPk are defined, for example by an instruction of the "map" type, and accessible from the different tasks TA and TB directly by their physical address.

FIG. 6 illustrates a situation from the prior art, where the tasks TA and TB are executed in parallel over a common period and each comprise an instruction InstrA and InstrB requesting access to a single shared memory zone ShMPi. These two access requests will be processed 11, 13 in an independent manner by the memory manager unit MMU of each processor, and will reach 12, 14 this shared memory zone independently of each other.

For the resources which are accessible only from certain instructions of the system call type, it is possible to instrument the system routines carrying out these instructions, i.e. to modify these routines or to insert elements into the system which intercept or react to these system calls. In the context of an functioning management by logging and replay, this instrumentation may enable in particular the recording of their behaviour in order to be able to replay it later identically, or to modify this behaviour so that it becomes deterministic and has no need to be recorded.

On the contrary, for resources accessible directly without a system call, therefore potentially from any program instruction, most operating systems and in particular those of the Unix or Linux type, do not enable to control the arrival of these accesses at the level of this shared memory zone ShMPi.

Figure 7:
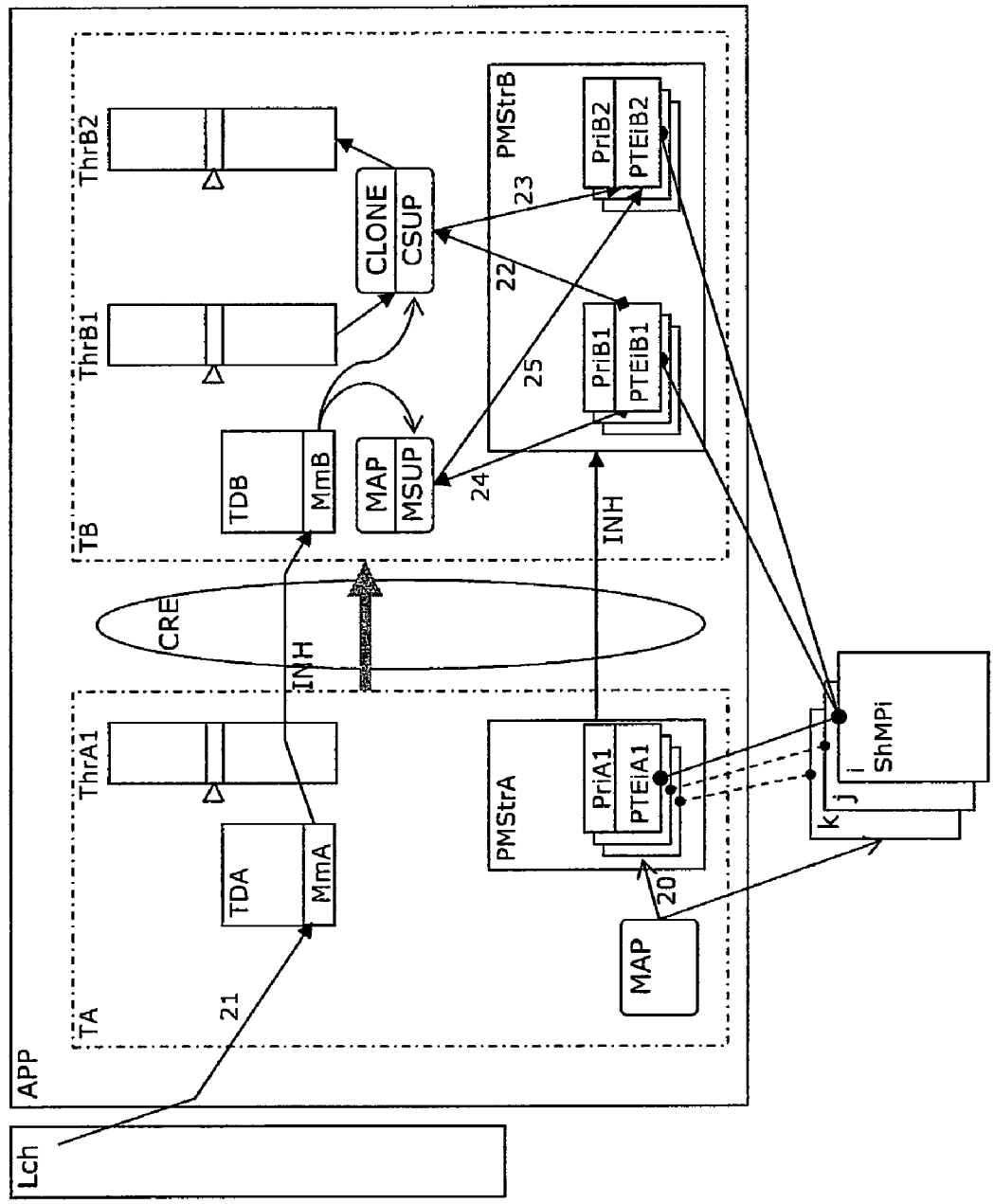
FIG. 7 illustrates, according to the invention, the creation and maintenance, within a task, of a structure enabling control of access to memory pages shared between a number of tasks executed in parallel on several different processors from a single environment.
Figure 8:
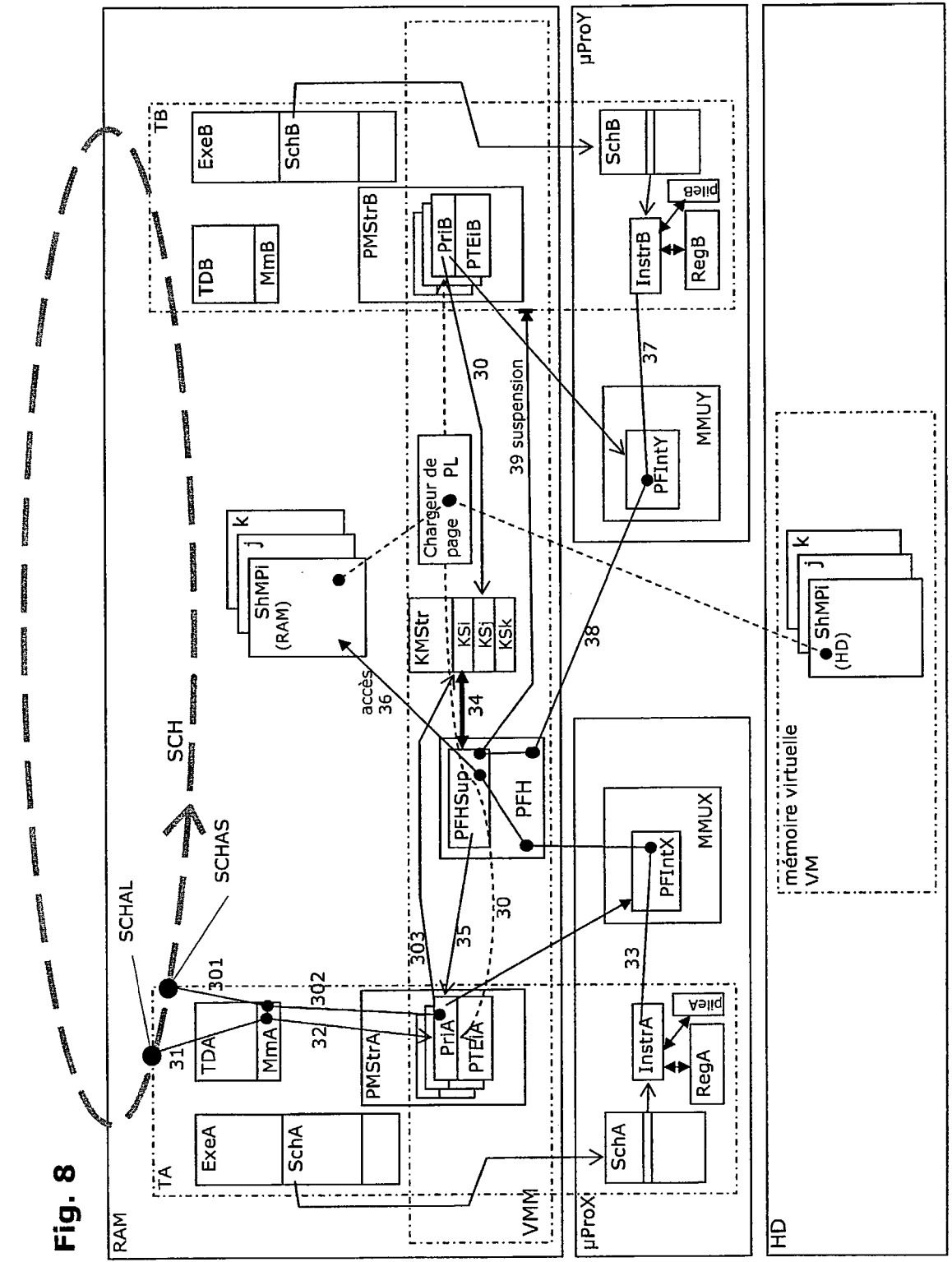
FIG. 8 illustrates, according to the invention, the functioning of control of access to memory pages shared by two tasks executed in parallel on two different processors from a single environment.

In order to resolve this problem, as illustrated in FIGS. 7 and 8, the invention proposes to modify the code of certain system software elements, or to add certain others, so as to modify or extend certain existing hardware functions, currently used for other functions.

In particular, it is possible to resolve this problem by modifying a small number of elements of a system software of the Unix or Linux type, without modifying the hardware characteristics of current processors. It is therefore possible to use machines of a common type, therefore economic and well proofed, in order to execute and manage slightly modified, or unmodified, multi-task applications, by bringing to existing system softwares only a few modifications, which add functionalities without compromising their upward compatibility.

The invention uses for this certain mechanisms existing in a number of recent micro-processors, such as the processors used in architectures of the PC type, for example Pentium processors from the Intel company, or Athlon from the AMD company. These processors, in particular since the Pentium 2, integrate within their memory management unit a virtual memory management mechanism. This mechanism is used in order to "unload" onto the hard disk certain pages defined in the working memory when they are not used, and to store them there in order to free the corresponding space within the physical memory. For the currently running applications, these pages still are listed in the working memory, but they must be "loaded" again in physical memory from the hard disk in order that a task could actually access it.

In order to manage this virtual memory, as illustrated in FIG. 8, the system software includes a virtual memory manager VMM, which creates, for each page of virtualisable memory, a page table entry ("P.T.E.") within each of the different application processes. Thus, for two tasks TA and TB, each executed in the form of a process, i.e. with an execution context which is proprietary to it, each of the pages ShMPi to ShMPk will get a page table entry PTEiA to PTEkA in the process of the task TA, as well as a page entry table PTEiB to PTEkB in the process of the task TB.

The virtual memory manager VMM comprises a page loader software PL, which loads and unloads memory pages into a "swap" file on the hard disk, for example a file with the extension ".swp" in the Windows system from the Microsoft company. During each loading or unloading of a ShMPi page, its state of presence or non-presence in physical memory is stored and maintained 30 by the VMM manager in each of the page table entries PTEiA and PTEiB which correspond to it. Within these tables PTEiA and PTEiB, this presence state is stored in the form of a data bit PriA and PriB respectively, at the value 1 for a presence and at the value 0 for an absence.

Within each processor μProX and μProY, the memory manager MMUX or MMUY includes a page fault interrupt mechanism PFIntX or PFIntY by which passes any access request originating from an executed program instruction InstrA or InstrB. If an instruction InstrA from a task TA executed by the processor μProX requests 33 an access pertaining to a memory page ShMPi, the interruption mechanism PFIntX of the processor verifies whether this page is present in physical memory RAM, by reading the value of its presence bit PriA in the corresponding entry table PTEiA.

If this bit PriA indicates the presence of the page, the interruption mechanism PFIntX authorises the access. In the opposite case, this interruption mechanism PFIntA interrupts the execution of the task TA and transmits the parameters of the error to an "Page Fault Handler" software agent PFH included in the virtual memory manager VMM of the system software. This fault handler PFH is then executed and manages the consequences of this error within the system software and vis-à-vis the applications.

FIG. 7 illustrates how these existing mechanisms are modified and adapted or diverted in order to manage access to the shared resources according to the invention.

In order to manage these accesses from an application APP executed in such a parallel environment, as illustrated in FIG. 7, a launcher software LCH is used to launch the execution of this application, for example in a system of the Unix or Linux type. On its launch, the application APP is created with a first task TA in the form of a process comprising an execution "thread" ThrA1, and using a data table forming a task descriptor TDA.

Within this task descriptor TDA, the launcher stores 21 the fact that this task TA must be managed, or "monitored", by modifying to 1 the state of a normally unused data bit, here termed management bit MmA.

The different shared memory zones in the working memory, here qualified as shared memory pages ShMPi, ShMPj, and ShMPk, are listed within the task TA in a data table forming a pages memory structure PMStrA. In this structure PMStrA, the shared pages are described and updated in the form of page table entries PTEiA1 to PTEkA1, each incorporating a data bit PriA1 to PrKA1 used by the virtual memory manager VMM as described previously. Typically, this pages structure PMStrA is created at the same time as the task TA, and updated 20 along with any changes in the shared memory, by the different system routines which ensure these changes, such as routines of the "map" type.

During the execution of the managed application APP, other tasks may be created by instructions CRE of the "create" type, from this first task TA or from others created in the same way. Any newly task TB created also includes a thread ThrB1 and a task descriptor TB, as well as a page memory structure PMStrB. Through an inheritance relationship INH from its parent task, the new page memory structure PMStrB also includes the different page table entries PTEiB1 to PTEkB1, with their presence bit PriB1 to PrkB1, which are maintained up to date in the same way.

On creation CRE of a new task TB from a monitored task TA, the new task descriptor TDB also comprises a management bit MmB, the value of which is inherited INH from that of the management bit MmA from the parent task.

During the execution of the managed application APP, other threads may be created within a task TB which functioned initially in the form of a process with a single thread ThrB1.

Within an existing and monitored task TB, any new thread ThrB2 is created by a system call, such as a "clone" instruction. Typically, a task in the form of a multi-thread processes comprises only one set of entry tables PTEiB1 to PTEkB1 within its pages structure PMStrB. According to the invention, the functioning of any system routine which is capable of creating a new thread, such as the "clone" system call, is modified, for example by integrating in it a supplementary part CSUP. This modification is designed so that any creation of a new thread ThrB2 in an existing task TB comprises the reading 22 of the existing set of tables PTEiB1 to PTEkB1 and the creation 23 of a new set of page table entries PTEiB2 to PTEkB2, corresponding to the same shared pages ShMPI to ShMPk and functioning specifically with the new thread ThrB2. This modification may for example be done by an instrumentation of these routines CLONE by using a technique of dynamic interposition through loading of shared libraries within the system, as described in patent FR 2 820 221 from the same applicants.

This creation is done in a way ensuring that the new tables PTEiB2 to PTEkB2 are also maintained up to date 24, 25 in a similar manner to their parent tables PTEiB1 to PTEkB1, either by registering them for updating into the system routines MAP managing this update, or by also instrumenting these system routines MAP, for example by integrating in them a supplementary part MSUP.

FIG. 8 illustrates the functioning of the access management using this structure applied to an example including two mono-thread tasks TA and TB executed in parallel in two processors µProX and µProY. It should be noted that the extension of the structure of the page table entries PTE to each thread ThrB2 cloned within each task also enable to manage in the same way any access coming from all threads belonging to monitored tasks, whether they be mono-thread or multi-thread.

In the embodiment described here, the access management according to the invention is arranged in order to guarantee to each task, in the sense of the process TA or TB as well as in the sense of each thread ThrB1 or ThrB2, an access to shared memory pages which is exclusive over the entire duration of an activation period during which their coherence (or consistency) is guaranteed by the system software. Such a period is described here as being an activation period allotted and managed by the scheduler SCH of the system software. It is clear that other types of coherence period can be chosen in the same spirit.

Also, the shared resources to which access is managed or controlled are here described in the form of shared memory, defined as specific memory zones or as memory pages. The same concept may also be applied to other types of resources by means of a similar instrumentation of the system routines corresponding to them.

The implementation of the invention may comprise a modification of some elements of the system software, so that they function as described below. The necessary level of modification may certainly vary, depending on the type or version of the system software. In the case of a system of the Linux type, these modifications comprise in general the instrumentation of "clone" and "map" type routines as described previously, as well as modifications and code additions within the agents producing the scheduler SCH, the page fault handler PFH and the page loader PL. The system functionalities to be modified to produce the type of access control described here may advantageously constitute sheer extensions compared with the functionalities of the standard system, i.e. without removing functionality or at least without compromising upward compatibility with applications developed for the standard system version.

Furthermore, although using the hardware mechanism envisaged in the processor for virtual memory management, the access control described may not necessarily need the deactivation of this virtual memory and may be compatible with it. The page loader PL may, for example, be instrumented or modified so that the loading into physical memory RAM of a virtual page ShMPi is not reflected in the presence bit PriB of this page by a monitored task TB if this page is already used by another task TA.

As illustrated in FIG. 8, at the start of one of its activation periods SchA, a task TA is released by the scheduler SCH at a time SCHAL. Before releasing this task, the scheduler SCH tests 31 the management bit MmA of this task TA to establish whether the access control must be applied to it. If this is the case, the scheduler SCH will then 32 set to 0 all the presence bits PriA to PrkA of the page table entries PTEiA to PTEkA corresponding to all the shared pages concerned by this access control, in order that any access request by this task TA causes by default a page error in the interruption mechanism PFIntX for all processors µProX where this task TA will be capable of being executed.

During this activation period SchA within the processor µProX, an instruction InstrA requests 33 an access to a shared memory page ShMPi. Because the corresponding presence bit PriA is at 0, the interruption mechanism PFIntX of the processor µProX suspends the execution of this access request and calls the page fault handler PFH of the system software, at the same time transmitting to it the identification of the page and of the task in question.

When processing this error, a supplementary functionality PFHSUP of the page fault handler PFH therefore carries out a test and/or modification within a data table forming the kernel memory structure KMStr ("Kernel Memory Structure") agent within the virtual memory manager VMM of the system software.

Typically, this kernel memory structure KMStr stores in a univocal manner for all of the working environment, or all of the working memory, data representing the structure of the memory resources and their development. According to the invention, this kernel memory structure KMStr also comprises a set of data bits, here termed access bits KSi, KSj and KSk which represent, for each of the shared pages ShMPi to ShMPk in question, the fact that an access to this page is currently granted (bit at 1) or not granted (bit at 0) to a task.

When the page fault handler PFH processes the error transmitted by the processor µProX, it consults 34 the access bit KSi corresponding to the ShMPi page in question. If this access bit does not indicate any current access, it modifies 34 this access bit KSi in order to store that it granted an access to this page, and also modifies 35 the presence bit PriA corresponding to the requesting task TA (bit changing to 1) in order to store the fact that this task TA now has an exclusive access to the page in question ShMPPi.

It should be noted that these test and modification operations of the access bit KSi of the kernel memory structure KMStr constitute an operation 34 which is implemented in an atomic manner, i.e. it is guaranteed that it is accomplished either completely or not at all, even in a multi-processor environment.

Once the page fault handler PFInt has attributed exclusivity on the requested page ShMPi, it relaunches the execution of the instruction InstrA so that it actually accesses 36 the content of this page.

After that, if an instruction InstrB from any another monitored task TB, executed in parallel by another processor µProY, requests 37 an access to this already attributed page ShMPi, the interruption mechanism PFIntY of this processor will also consult the presence bit PriB of this page for the requesting task TB. As the task TB is a monitored task, the presence bit PriB consulted is in the absence position (value at 0). The interruption mechanism PFIntY will therefore suspend the requesting instruction InstrB and transmit 38 an error to the page fault handler PFH.

This time, this page fault handler PFH notes that the access bit KSi of this page is at 1, indicating an exclusivity has been granted already on this page ShMPi to another task. The page fault handler PFH will therefore initiate 39 a suspension of the whole of the requesting task TB, for example by ending its activation period into the system software context change manager. During its next activation period, this task TB will therefore repeat its execution exactly to the point where it was interrupted, and will be able to attempt once more to access this same page ShMPi.

In the case where the requesting task is a thread ThrB2 (FIG. 7) belonging to a multi-thread process, the existence of a set of page table entries PTEiB2 specific to this single thread ThrB2 enables to suspend only the thread which requests access to a page already allocated in exclusive access, and not the other threads ThrB1 which would not enter into conflict with this exclusivity.

On completion SCHAS of the activation period SchA of each task, the scheduler suspends the execution of this task and backs up its execution context.

On this suspension SCHAS or on a suspension 39 on a page request which is already allocated, the invention also envisages a release phase for all shared memory pages for which this task received an exclusive access. Thus, if the scheduler SCH notes 301 through the management bit MmA that the task TA in course of suspension is monitored, it scans all the page table entries PTEiA to PTEkA of this task to establish on which pages it has an exclusive access, by consulting the state of the different presence bits PriA to PrkA. Based on this information, it will then release all these pages ShMPi by resetting to 0 their access bit KSi in the kernel memory structure KMStr.

In other unrepresented variants, it is also possible to decouple the concept of management or monitoring into several types of management, for example by envisaging several management bits within a single task descriptor. A task may therefore be monitored so as to benefit from an exclusive access as regards certain categories of task. Similarly, a task may be excluded only by certain categories of task.

Thus, through suspending all the tasks which seek to access a page which is already allocated, an exclusivity of this page is obtained for the first task which requests it, without disturbing the coherence of the execution of the other tasks thus suspended.

Through avoiding any modification of a single memory zone shared by two tasks being executed at the same time, this therefore avoids any interference between them in the change of content of this memory zone. From a given initial state for this memory zone, at the start of each activation period of a task which accesses it, the change of its content thus depends only on the actions of this task during this activation period. For a given sequence of instructions executed by this task, for example a scheduled activation period, and by starting from an known initial state, it is thus possible to obtain a execution of this sequence which is deterministic and repeatable vis-à-vis this task.

Because, in particular, of the use of an atomic operation for storing the allocation of exclusivity on an accessed memory zone, the method enables to avoid or reduce the risks of deadlock of a single resource shared between a plurality of tasks seeking to access it competitively.

Advantageously, on attribution to an accessing task TA of an exclusive access for the rest of this period to the shared memory page ShMPi, the page fault handler PFH, PFHSUP may prepare a logging datum representing this attribution. This logging datum comprises an identification of the task TA to which this exclusive access was attributed, and possibly other complementary data applying to the context or representing the position of the requesting instruction InstrA in the execution of the task TA in question, as well as the number of instructions executed by this task TA in the duration of the exclusive access obtained.

Within the system software, this logging data may be grouped in a access log representing the succession of exclusive accesses attributed during a certain period of time or of execution. This log comprises in particular an ordered set of data identifying, for example by their PID or TID, the succession of tasks having obtained these exclusive accesses. Each resource accessed by a monitored task may therefore give rise to the establishment of a log which is proprietary to it and groups the succession of tasks having obtained a exclusive access over this resource.

By combining these access control techniques (FIGS. 7 to 8) with the techniques for logging deterministic periods described above (FIGS. 1 to 5) as well as with checkpointing and logging and replay techniques described in the applications cited above, the invention proposes to also implement in parallel architecture systems the different types of functioning management described previously.

Figure 9:
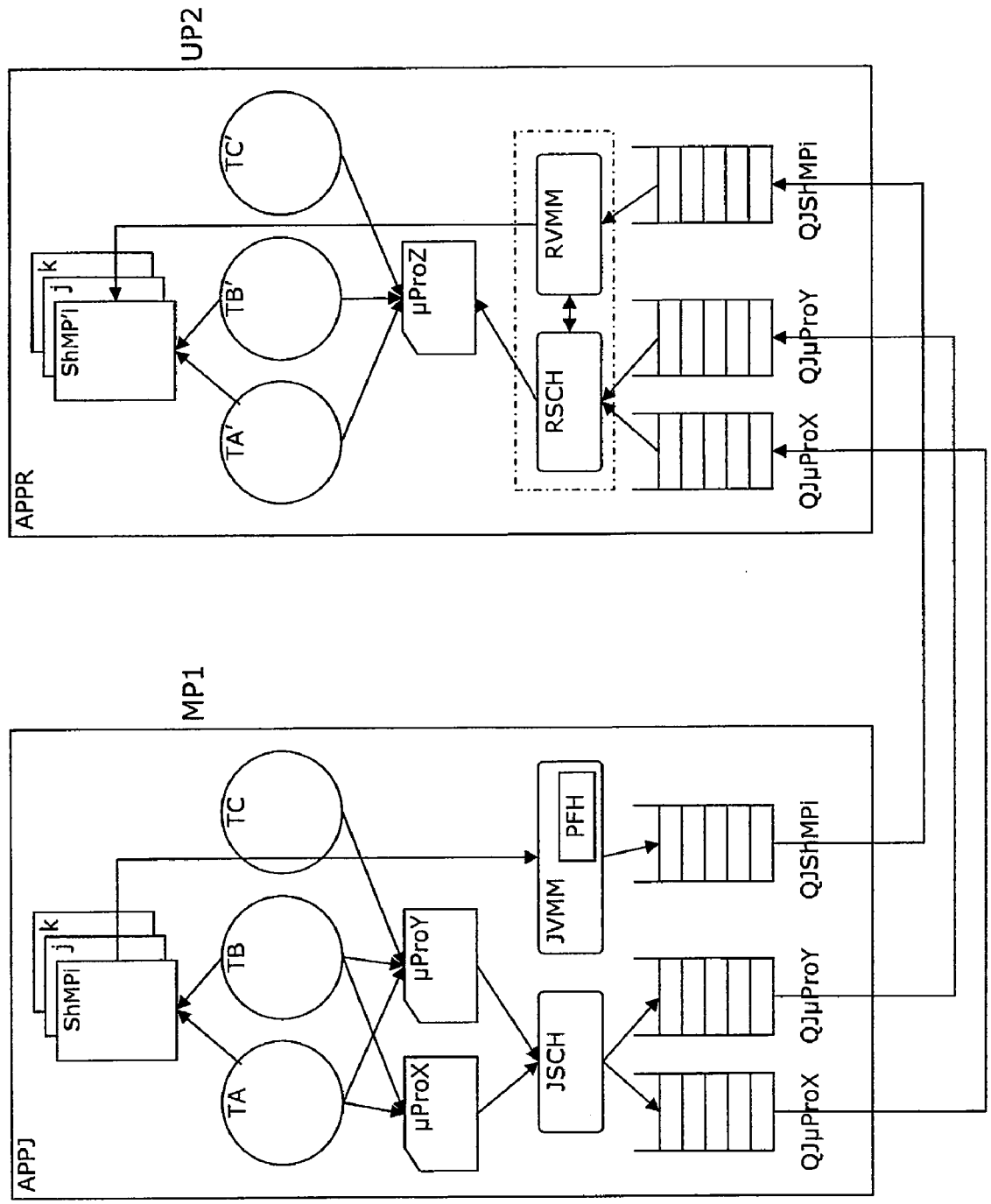
FIG. 9 illustrates, according to the invention, a logging of a multi-task application on a multi-processor computer and its on-the-flow replay on a mono-processor machine.

FIG. 9 therefore illustrates, according to the invention, a logging of a multi-task application APPJ on a multi-processor system MP1 and its replay as required in a monoprocessor system UP2.

For the logged application APPJ, the logging agent JSCH logs, for each processor μProX or μProY, the succession of all activation periods for the different monitored tasks TA, TB and TC. As described above, it transmits them separately as queues QJμProX and QJμProY respectively. It should be noted that if a task is executed once in a processor and once in another processor, activation periods for this task will be present in the two queues.

With shared resources ShMPi to ShMPk accessed by the logged application APPJ, a logging agent JVMM records, for each of these resources, logging data representing the succession of exclusive accesses allocated on this resource. This exclusive access logging data is generated within the virtual memory manager VMM, by the page fault handler PFH, along with the exclusive accesses which it allocates to the different tasks.

Each recording of this access logging data comprises in particular:
  a univocal identifier of the shared resource in question, for example, an address for a shared memory zone;
  an identifier (PID or TIP) for the task which obtained this access;
  the duration of this exclusive access, obtained for example through counting technique described here;
  complementary data allowing compensation for the inaccuracy of this counting, for example a signature as described previously;
  and certain complementary data that are useful, for example, for the virtualisation of system resources and of the different external or input/output events.

This logging data is transmitted to a logging queue QJShMPi of the FIFO type.

Depending on the embodiments, it is possible to store the content of these queues QJμProX, QJμProY, QJμMPi in one or more log files, for example, for a later use.

Out of these queues, the different logging data is transmitted to the replay system UP2, by communication means such as a computer communication network.

The data from each logging queue QJµProX, QJµProY, QJµMPi is received by a replay queue QRµProX, respectively QRµProY, QRµMPi which corresponds to the issuing queue.

In the output of these replay queues, logging data of the different logged processors µProX et µProY is combined together, according to the access logging data, so as to restore the combined serialisation of the logged activation periods and the allocated (continuous) exclusive accesses.

Within the replay system, after defining this replay serialisation, or replay scheduling, execution of a replay is launched in the replay processor.

It should be noted that the number of replay processors may have no importance excepted the performances at replay, as soon as the tasks are distributed among these processors in a manner which does not break the scheduling of this replay serialisation.

From a logged application APPJ in a multi-processor system MP1, it is therefore possible to obtain a replay of the deterministic periods of the different tasks TA, TB, TC of its application, in the form of replay tasks TA', TB', TC' in a replay machine UP2. By combining this replay of deterministic periods with a logging and a replay of non-deterministic events and in particular of external events, the invention enables to obtain in a high-performance manner a replay application APPJ reproducing the execution of the logged application APPJ.

By transmitting the logging data from the logged system to the replay system as soon as it is generated (on-the flow), it is possible to produce a following or "shadow" replay application which runs in exactly the same way as the logged application, simply with a time delay. The term "active-active" configuration can be used in this type of situation, where both applications are under execution, in contrast for example to the techniques storing the state of the application as a future provision.

In such an "active-active" configuration, it can be considered that the replay application APPR constitutes an active replica of the master or primary application. This active replica presents a slight time delay which can depend on factors such as the comparative performances of the two systems, to which the times of transmission and processing of the logging data are principally added. The typical delay is a few scheduling periods, which is commonly a few milliseconds.

On first consideration, the techniques described here may allow the implementation of a functioning management which represents only a small overhead compared with the original or legacy application, and only a loss of performance of a kind which is possibly acceptable in an exploitation situation.

The invention advantageously enables to apply this type of "active-active" configuration to the implementation of an application reliabilization, where the active replica can be used as a mirror application of the original and take over from it in case of failure or on a particular event. Compared with hardware implementations of mirror systems, the invention enables much more flexibility in the functioning as well as in the hardware management, owing to its improved independence from the hardware characteristics of the machines employed.

Such a configuration thus enables to bring fault tolerance functionalities to an existing application, in a flexible and non-intrusive manner, at the same time limiting losses of performance and even in a parallel architecture.

These advantages exist also while using such an "active-active" configuration in order to produce a balancing or an adjustment of the work load ("load balancing"), by redistributing all or part of the services from the logged application to the active replica. This may be for example to optimise the use of the hardware, or to free a part of it in order to implement a relocative maintenance.

It should be noted that the different mechanisms described here use the software part in a manner dissociated from the hardware part. Good independence with respect to the hardware is then obtained, which, in particular, makes the implementation simpler and more reliable and conserves good performances by allowing the architecture to manage itself at best the parallelism of the different calculating elements, should these be processors or computers.

Moreover, due to the invention being most often purely software implemented, it is possible to use standard hardware with all the advantages implied.

The invention in particular enables to extend to parallel environments the functioning management techniques that were developed for multi-task applications functioning in shared time over a single calculating element. Thus, the invention enables to integrate such parallel environments into networks or clusters in which this functioning management is implemented within an application of the middleware type, for example in order to manage distributed applications or variable deployment applications providing an "on-demand" service.

Obviously, the invention is not limited to the examples which have just been described and numerous amendments may be made thereto, without departing from the framework of the invention.

The invention claimed is:

1. A method for managing a computer task, termed target, during a given execution period, termed activity period, within a computer system, in a computer processor provided with means of monitoring or estimating performance and including a counter with a given possible error in plus or minus, termed relative error, this process comprising:

an evaluation of a number of executed instructions up to at least one given point of said activity period, using said counter; and a generation of data, termed signature, determined from the state of the computer system and corresponding to at least one given point of said activity period;

wherein the method logs the use of a processor by storing in an ordered fashion, in at least one file termed processor log, logging data representing the logging of a succession of activity periods of a plurality of tasks executed in said processor, said logging data comprising for each of the activity periods a datum identifying the executed task; and wherein the method carries out, from the logging data, a replay of the logged period by managing a task, termed replayed task, executed by a processor, termed replay processor, within a replay computer system, starting from a state corresponding to a state of a logged system at the start of the logged period, the method also comprising:

from the start of the replay period, a monitored execution phase executing a number of instructions, evaluated by the counter, less than or equal to the supposed value of the number of instructions of the logged period, reduced by the relative error of said counter;

a confirmation phase comprising an iteration of the following steps:

interruption of the execution of the replay task at a given point in the replay; and comparative test between the logged signature and the signature corresponding to the replay interruption point.

2. The method according to claim 1, wherein the logged signature includes a datum termed log pointer, representing the value of the instruction pointer of the logged task at the end of the logged period, the method also comprising a setting up of a breakpoint on the replay instruction corresponding to the logged pointer datum.

3. The method according to claim 1, wherein the monitoring of the execution of the replay task comprises an overflow of the counter, initialised beforehand in order to determine a number of instructions having to be executed from the start of the replay period and the overflow of which causes an interruption of the replay task.

4. The method according to claim 3, wherein the counter is initialised at the start of the replay period with a certain margin, in order to overflow sufficiently early in order that, in case of a latency period existing between the overflow of the counter and the interruption of the task which has caused it, the number of instructions executed by the replay task is less than or equal to the supposed value of the number of instructions of the logged period, reduced by the relative error of said counter.

5. The method according to claim 1, wherein the confirmation phase comprises a security step signalling an error if the number of replayed instructions exceeds the supposed value of the number of logged instructions increased by a given number of instructions.

6. The method according to claim 1, wherein the method carries out, in a replay processor, a replay of the use of a logged processor, by using an ordered set of logging data of a succession of activity periods logged in said logged processor.

7. The method according to claim 1, wherein the method carries out a logging of a succession of attributed exclusive accesses pertaining to a shared resource, termed target resource, accessed by a plurality of logged tasks, this method also transmitting or storing at least one file termed resource log, comprising at least one identification of the successive tasks having obtained these exclusive accesses.

8. The method according to claim 7, wherein the method manages the functioning of at least two application tasks, implemented within a system software managing by sequential activation the execution of said tasks in a computer system, endowed with a parallel structure comprising calculation means capable of executing a number of application tasks simultaneously in at least two arithmetic units, these two application tasks accessing to at least one shared resource, the method comprising:

a logging of a first succession of activation periods of one of these tasks in a first arithmetic unit; and a logging of a second succession of activation periods of one of these tasks in a second arithmetic unit;

and a logging of a succession of attributions, to a so-called accessing task among said tasks in response to a request for access to said target resource, of an access termed exclusive to said target resource, with such an attribution excluding any access to said target resource by another of these tasks during the entire rest of the activation period of the accessing task immediately after said request for access;

the method also comprising a combination, in an ordered structure termed replay serialisation, of logging data representing successions of activation periods in each of the arithmetic units, combined with logging data representing the succession of attributed exclusive accesses, so as to maintain the order of succession of the activation periods within each task and vis-à-vis said shared resource.

9. The method according to claim 8, wherein the replay serialisation data is used in a replay computer system for replaying the logging of the successions of activation periods of the tasks in the first and second arithmetic units.

10. The method according to claim 9, wherein the method comprises a virtualisation, within the replay computer system, of at least part of the software resources accessible, during the logging, to the tasks logged.

11. The method according to claim 9, wherein the method carries out a replication, termed active, of the functioning of a logged application comprising at least two tasks, executed over at least one node with parallel structure, termed primary node, of a network of computers and accessing at least one shared resource, this replication comprising a replay, in at least one replay application over a replay system, of a replay serialisation originating from logging data transmitted on-the-flow from the primary node to the secondary node when generated.

12. The method according to claim 11, wherein the method carries out a reliabilization of an application comprising at least two tasks, executed over at least one node with parallel structure, termed primary node, of a network of computers and accessing at least one shared resource, this reliabilization also comprising a switching of service, from the primary node to at least one secondary node instead of the primary node, initiated on detection of a failure or of a given event within the primary node.

13. The method according to claim 11, wherein the method carries out an adjustment of the work load within a network of computers executing over at least one secondary node an active replica of a target application executed over a primary node, this load balancing comprising a switching to the active replica of at least part of the service provided by the managed target application.

* * * * *